Oct. 9, 1923.
T. S. HUSHER
STEAM SHOVEL ATTACHMENT
Filed Feb. 2, 1923
1,470,532
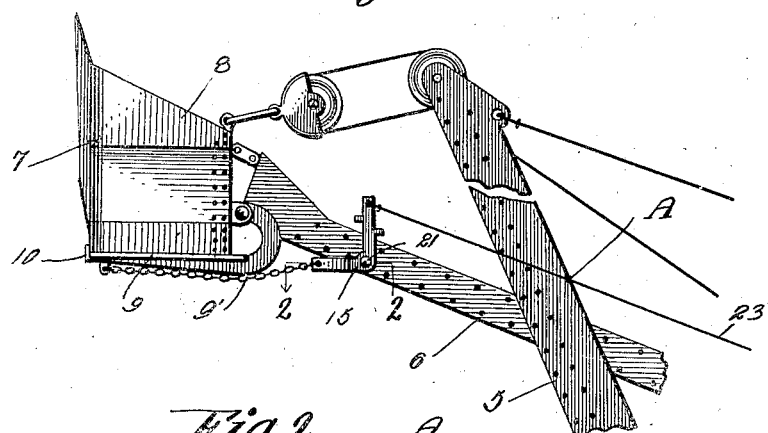
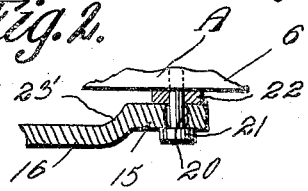
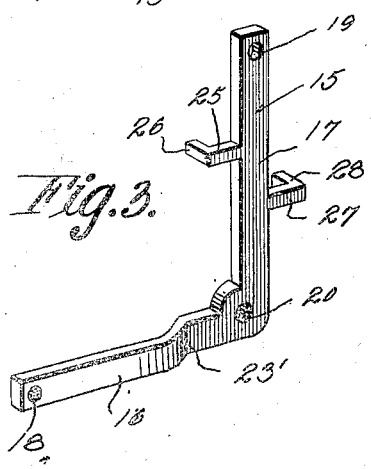
WITNESSES
Inventor
THOMAS S. HUSHER
By Richard B. Owen
Attorney Patented Oct. 9, 1923.

1,470,532

UNITED STATES PATENT OFFICE.

THOMAS S. HUSHER, OF BOSTON, MASSACHUSETTS.

STEAM-SHOVEL ATTACHMENT.

Application filed February 2, 1923. Serial No. 616,571.

*To all whom it may concern:*

Be it known that I, THOMAS S. HUSHER, a citizen of the United States, residing at Boston, in the county of Suffolk and State of Massachusetts, have invented certain new and useful Improvements in a Steam-Shovel Attachment, of which the following is a specification.

This invention relates to a novel attachment for the dipper arms or sticks of a steam shovel and the primary object of the invention is to provide a novel means for operating the latch of the hinged bottom of the shovel or bucket, which is so constructed that the pull or operating line therefor will be always out of the way of the cart or truck into which the dirt or other debris is dumped, thereby effectively preventing the entangling of said line in the truck or wagon.

Another object of the invention is to provide a bell crank lever pivoted at its angle to the dipper arm or stick adjacent to the shovel or bucket with means for attaching one arm thereof to the pull chain for the latch and with means for attaching the other arm thereof to the operating line or rope.

A further object of this invention is to provide a novel bell crank lever for this purpose, having means for normally maintaining the same in an operative position at all times, said means embodying stops for limiting the swinging movement of the bell crank lever on said shovel or dipper arm.

A still further object of the invention is to provide an improved means for operating the catches of the steam shovel bucket of the above character, which will be durable and efficient in use, one which will be simple and easy to manufacture, and one which can be incorporated with a steam shovel at a minimum cost.

With these and other objects in view the invention consists in the novel construction, arrangement and formation of parts, as will be hereinafter more specifically described, claimed and illustrated in the accompanying drawings, in which drawings:

Figure 1 is a fragmentary side elevation showing the improved device incorporated with a steam shovel.

Figure 2 is an enlarged detail section taken on the line 2—2 of Figure 1, illustrating the means for mounting the improved bell crank on the dipper or shovel arm.

Figure 3 is a detail perspective view of the improved bell crank.

Referring to the drawings in detail, wherein similar reference characters designate corresponding parts throughout the several views the letter A indicates a fragment of a steam shovel, which includes the ordinary boom 5, the shovel or dipper arm 6, which carries the dipping shovel or bucket 7. The arm 6 is mounted on the boom 5 in the ordinary manner and operated in the usual way. The bucket 7 is also carried by the dipper or shovel arm in the ordinary manner and includes the body 8 having the hinged bottom 9, which is normally maintained in a closed position by a spring catch 10.

The improved means for operating the spring latch embodies primarily a bell crank lever 15, which as shown includes a pair of right angularly disposed arms 16 and 17, which are provided at their outer terminals with openings 18 and 19, for a purpose, which will be hereinafter more fully described. The improved bell crank lever 15 at its angle, is provided with a pivot opening 20 for receiving the pivot bolt or pin 21 upon which it is rotatably mounted. As shown the walls of the pivot opening 20 is concave, in order to maintain the bell crank true at all times on the pivot pin or bolt 21. If so desired a suitable spacing washer 22 can be placed upon the bolt or pivot pin 21 intermediate the bell crank lever 15 and the dipper or shovel arm 6.

In order to prevent the arm 16 from coming into contact with bolt or rivet heads on the arm 6, the arm 16 can be offset, as at 23.

The pull chain 9' for the spring catch 10 is hooked in the opening 18 or otherwise attached to the arm 16, while the operating rope or cable 23 is inserted through the opening 19 and tied to the lever. It is obvious through proper manipulation of the bell crank lever 15 through the medium of the cable 23, that the latch 10 can be readily actuated. Owing to the position of the lever, the cable 23 will be at all times disposed in close proximity to the dipper arm 6, and will extend straight back therefrom toward the cab, and thus effectively prevent this rope from becoming entangled with extraneous objects.

The forward end of the arm 17 has formed thereon adjacent to but in spaced relation to the upper end of the arm thereof a laterally extending lug 25, the terminal of which is provided with inwardly extending ear 26 which is disposed in such a manner as to engage the arm 6, when the bucket is lowered to scrape up the dirt or other débris and thus prevent the lever from going down too far.

Formed on the opposite edge of the arm 17 from the lug 25 and inwardly of the same is a similar lug 27, which has formed on its end an inwardly extending stop ear 28, which is also adapted to engage the arm, to prevent the lever from being pulled back too far when the bucket is being dumped.

It is obvious from the foregoing that an exceptionally simple and durable device has been provided for steam shovels, which will effectively aid in the dumping of the bucket or shovel thereof and prevent the pull rope for the spring catch from hanging down and becoming entangled with extraneous objects.

Changes in details may be made without departing from the spirit or scope of this invention.

What I claim as new is:—

1. The combination with a steam shovel including a boom, a dipper arm slidably carried by the boom, a shovel connected with the dipper arm including a swinging bottom and a spring latch for said bottom, of a bell crank lever pivotally secured at its angle to the dipper arm, a pull chain connected with the outer end of one arm of the bell crank lever and to the spring latch, an operating cable secured to the outer end of the other arm of the bell crank lever, and stops formed on the opposite edges of one arm of the bell crank lever for engagement with the dipper arm to limit the swinging movement of said lever.

2. The combination with a steam shovel including a boom, a dipper arm slidably carried by the boom, a shovel carried by the dipper arm including a hinged bottom and a spring latch for engaging the spring bottom, of a bell crank lever pivotally secured at its angle to the dipper arm, means connecting the outer end of one arm of the bell crank lever to the spring catch, an operating cable secured to the outer end of the other arm of the bell crank lever, laterally extending lugs formed on the opposite edges of the last mentioned arm of the bell crank lever disposed in spaced relation to each other, inwardly extending stop ears formed on said lugs and arranged to engage the dipper arm during swinging movement of the bell crank lever to limit the movement thereof.

3. The combination with a steam shovel including a boom, a dipper arm slidably carried by the boom, a shovel connected with the outer end of the boom including a hinged bottom, of a bell crank lever including a pair of angular related arms, one of said arms being offset, means connecting the outer terminal of the offset arm to the spring catch, a pivot bolt carried by the dipper arm, the bell crank lever being provided at its angle with a concaved opening for receiving said pivot bolt, a laterally extending lug formed on one edge of the other arm of the bell crank lever, a laterally extending lug formed on the other edge of the last mentioned arm of the bell crank lever, and inwardly extending stop ears formed on the outer terminals of said lugs for engaging one edge of the dipper arms.

In testimony whereof I affix my signature in presence of two witnesses.

THOMAS S. HUSHER.

Witnesses:
MAURICE PONTE,
TIMOTHY J. HUSHER.